United States Patent [19]

Saha et al.

[11] Patent Number: 4,778,628

[45] Date of Patent: Oct. 18, 1988

[54] UNDERGROUND WASTE BARRIER STRUCTURE

[75] Inventors: Anuj J. Saha, Hamburg, N.Y.; David C. Grant, Gibsonia, Pa.

[73] Assignee: The United States of America as represented by the United States Department of Energy, Washington, D.C.

[21] Appl. No.: 863,485

[22] Filed: May 15, 1986

[51] Int. Cl.[4] .......... G21F 9/12; G21F 9/24; G21F 9/08; B65G 5/00

[52] U.S. Cl. .......... 252/633; 250/506.1; 250/507.1; 252/628; 252/631; 376/272; 405/53; 405/55; 405/128; 405/129; 405/267; 405/268; 405/270

[58] Field of Search .......... 250/506.1, 507.1; 252/628, 633, 631; 376/261, 272; 405/128, 129, 267, 268, 266, 270, 53, 55; 52/169.6, 169.14

[56] References Cited

U.S. PATENT DOCUMENTS

| | | | |
|---|---|---|---|
| 1,630,589 | 5/1927 | Taber | 405/288 |
| 3,017,242 | 1/1962 | Ames | 23/25 |
| 3,097,920 | 7/1963 | Knoll | 23/25 |
| 4,158,639 | 6/1979 | Berty | 252/630 |
| 4,166,709 | 9/1979 | Valiga | 405/129 |
| 4,192,629 | 3/1980 | Hallenius et al. | 405/128 |
| 4,297,827 | 11/1981 | Allison | 252/628 |
| 4,352,601 | 10/1982 | Valiga et al. | 405/128 |
| 4,362,434 | 12/1982 | Valiga et al. | 405/128 |
| 4,375,930 | 3/1983 | Valiga | 405/128 |
| 4,376,792 | 3/1983 | Angelini et al. | 405/129 |
| 4,432,894 | 2/1984 | Kamiya et al. | 252/631 |
| 4,439,062 | 5/1984 | Kingsbury | 405/129 |
| 4,483,641 | 11/1984 | Stoll | 405/129 |
| 4,623,464 | 11/1986 | Ying | 210/631 |
| 4,624,604 | 11/1986 | Wagner et al. | 405/128 |

OTHER PUBLICATIONS

Hurlbut, Jr. et al., 1977, Manual of Mineralogy, 19th edition, John Wiley & Sons, Inc., pp. 438–439.

*Primary Examiner*—Stephen J. Lechert, Jr.
*Assistant Examiner*—Howard J. Locker
*Attorney, Agent, or Firm*—D. P. Cillo

[57] ABSTRACT

Disclosed is an underground waste barrier structure that consists of waste material, a first container formed of activated carbonaceous material enclosing the waste material, a second container formed of zeolite enclosing the first container, and clay covering the second container. The underground waste barrier structure is constructed by forming a recessed area within the earth, lining the recessed area with a layer of clay, lining the clay with a layer of zeolite, lining the zeolite with a layer of activated carbonaceous material, placing the waste material within the lined recessed area, forming a ceiling over the waste material of a layer of activated carbonaceous material, a layer of zeolite, and a layer of clay, the layers in the ceiling cojoining with the respective layers forming the walls of the structure, and finally, covering the ceiling with earth.

18 Claims, 1 Drawing Sheet

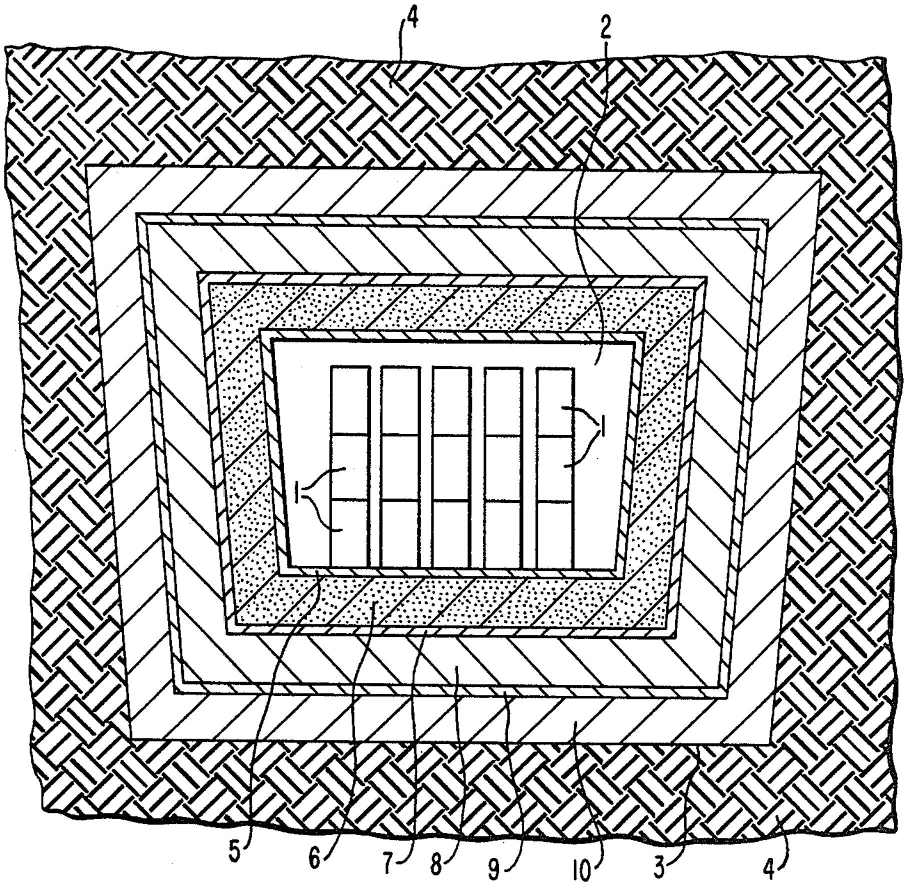
4
2
1
1
5
6
7
8
9
10
3
4

UNDERGROUND WASTE BARRIER STRUCTURE

The Government of the United States of America has rights in this invention pursuant to Contract No. DE-AC07-81-NE-44139.

BACKGROUND OF THE INVENTION

This invention is related to application Ser. No. 860,922, filed May 8, 1986, by A. K. Saha titled "Removing Strontium Ions From Aqueous Solutions," and application Ser. No. 857,677, filed Apr. 30, 1986, by A. K. Saha, entitled "Removing Strontium And/Or Cesium Ions From Solutions Containing Chemical Hardness."

Radioactive and toxic waste materials are often stored in 55 gallon drums which are placed in underground trenches. While these trenches are typically lines with clay, it has been found that water leaking into the trenches can carry radioactive and toxic materials through the clay barrier into the surrounding earth, contaminating water supplies and creating an environmental hazard. This can occur because the drums corrode, rust, or otherwise break or deteriorate, permitting the ground water to contact their contents. Even when the waste material is encapsulated within cement, the ground water can eventually leach radioactive or toxic materials from the cement. This is a particularly difficult problem to deal with because the ground water can contain organic materials which can foul or plug binders placed within the drums for the purpose of preventing radioactive or toxic materials from leaching out.

SUMMARY OF THE INVENTION

We have discovered an underground barrier structure that will effectively prevent the dispersion of toxic or radioactive ions into the surrounding earth. The barrier structure of this invention is effective even when organic molecules are present. The barrier structure of this invention is relatively inexpensive and permanent.

DESCRIPTION OF THE INVENTION

The accompanying drawing is a side view in section showing a certain presently preferred embodiment of an underground barrier structure according to this invention.

In the drawing, 55-gallon steel drums 1 are placed within a space 2 enclosed by a multi-layered container 3 under earth 4. The inner layer of container 3 is a stiffener 5 which supports a layer of activated carbonaceous material 6. Surrounding activated carbonaceous material 6 is a second stiffener 7 which supports a layer of zeolite 8. Surrounding the layer of zeolite is a third stiffener 9 which supports a layer of clay 10.

In preparing the underground waste barrier structure of this invention, a trench, hole, or other depression is formed in the earth. A typical trench might be about 6 to about 16 feet in width at the bottom, about 12 to about 18 feet wide at the top, with a height of about 12 to about 30 feet, and with sides that slope at an angle of about 5° to about 10°.

While not considered to be absolutely necessary, it is preferable to line the depression in the earth with a layer of clay to reduce the penetration of water into the cavity and increase the safety of the barrier. Suitable clays include nontronite, kandite, illite, and chlorite. The preferred clay in nontronite because it is effective, inexpensive, and readily available. The layer of clay is preferably about 3 to about 6 inches in thickness as it is difficult to form thinner layers which are not broken, and thicker layers are usually unnecessary.

If desired, a stiffener may be placed against a layer of clay to prevent it from falling within the cavity. Stiffeners may include materials such as plywood, "Micarta" laminates, sheet metal, and other types of material.

In the next step of the process of this invention, the depression is lined with a layer of zeolite. While synthetic zeolite may be used, natural zeolite (mineral) is preferred as it is much less expensive and it may be more effective in containing certain radioactive ions. Suitable zeolites includes clinoptilolite, erionite, chabazite, phillipsite, and mordenite. The preferred zeolite is erionite because it is readily available, has a fibrous structure (less permeable), and is more effective. The zeolite layer is preferably about 3 to about 9 inches in thickness as thinner layers which may be breached and thicker layers are usually unnecessary. If desired, another stiffener can be placed against the zeolite layer to retain it in place.

In the next step of the process of this invention, a layer of activated carbonaceous material is placed against the inside of the depression, next to the zeolite. The purpose of the activated carbonaceous material is to remove any organic materials that may be present in the waste materials before they can reach the layer of zeolite, since organic materials tend to foul the zeolite and prevent it from effectively removing radioactive and toxic materials. Any type of activated carbonaceous material can be used, such as activated coconut shell and activated bone char. Preferably, the activated carbonaceous material is bone char as it is inexpensive and more effective than other activated carbonaceous materials. In addition, the activated carbonaceous material will also remove radioiodine and certain other radioactive species that may be present. The layer of activated carbonaceous material is preferably about 3 to about 9 inches thick as thinner layers may be broken and thicker layers are usually unnecessary. A stiffener may also be placed against the layer of activated carbonaceous material to retain it in place.

The radioactive or toxic waste material is then placed within the structure that has been formed. Typically, the waste material is in 55-gallon drums, although it may also be in other forms. The drums may contain cement that contains the waste material or the drums may contain fluid or solid waste without cement being present. Radioactive wastes may be low to intermediate level wastes, and toxic wastes can include substances such as polychlorinated biphenyls, dioxane, trichloroethylene and other toxic materials.

In the next step of the process of this invention, a ceiling is formed over the containers holding the waste. The ceiling is formed by applying the same layers used to form the walls but in reverse order. The materials forming the ceiling should cojoin with the same materials that form the walls so that each layer of the container completely surrounds the waste material. The completed structure is then covered with earth, typically to a depth of 1 to 6 feet, depending upon radiation level and toxicity present.

We claim:

1. An underground waste barrier structure comprising:

(1) waste material;

(2) a first unbroken container formed of activated carbonaceous material completely enclosing said waste material, said first container being large enough to hold at least one 55 gallon drum;

(3) a second unbroken container formed of zeolite completely enclosing said first container, whereby said first container removes organic material that may leave said waste material and prevents said organic material from fouling said zeolite; and (4) earth covering said second container.

2. A structure according to claim 1 wherein said waste material is radioactive.

3. A structure according to claim 1 wherein said activated carbonaceous material is bone char.

4. A structure according to claim 1 wherein said zeolite is a natural zeolite.

5. A structure according to claim 4 wherein said natural zeolite is erionite.

6. A structure according to claim 1 wherein said first and second containers are each about 3 to about 9 inches thick.

7. A structure according to claim 1 including a third unbroken closed container of clay, enclosing said second container.

8. A structure according to claim 7 wherein said third container is about 3 to about 6 inches thick.

9. A structure according to claim 1 wherein said waste material is sealed in steel drums.

10. A structure according to claim 1 including means for supporting the walls and ceiling of said first and second containers.

11. An underground waste barrier structure comprising:

(1) earth forming a space therein having a ceiling, walls, and a floor;

(2) an unbroken layer of zeolite completely covering said ceiling, walls, and floor and forming a closed container of said zeolite;

(3) means for immobilizing said layer of zeolite;

(4) an unbroken layer of activated carbonaceous material forming a closed container of said activated carbonaceous material within said closed container of zeolite;

(5) means for immobilizing said layer of activated carbonaceous material; and (6) waste material in an amount of at least 55 gallons, enclosed within said layer of activated carbonaceous material, whereby said layer of activated carbonaceous material removes organic material that may leave said waste material and prevents said organic material from fouling said zeolite.

12. A method of disposing of waste material comprising:

(1) forming a recessed area within the earth;

(2) lining said recessed area with a layer of zeolite;

(3) lining said layer of zeolite with a layer of activated carbonaceous material to form a cavity of a size sufficient to hold at least one 55 gallon drum;

(4) placing said waste material within said cavity;

(5) forming a ceiling over said waste material of a layer of said zeolite on a layer of said activated carbonaceous material, said layers cojoining with said respective layers formed in steps (2) and (3) to form a closed container of said activated carbonaceous material inside a closed container of said zeolite; and (6) covering said ceiling with earth, whereby said layer of activated carbonaceous material removes organic material that may leave said waste material and prevents said organic material from fouling said zeolite.

13. A structure according to claim 1 which lies in a trench about 6 to about 16 feet in width at the bottom, about 12 to about 18 feet wide at the top, with a height of about 12 to about 30 feet, and with sides that slope at an angle of about 5° to about 10°.

14. A structure according to claim 1 wherein said waste material contains organic matter.

15. A structure according to claim 11 wherein said space is about 6 to about 16 feet in width at the bottom, about 12 to about 18 feet wide at the top, with a height of about 12 to about 30 feet, and with sides that slope at an angle of about 5° to about 10°.

16. A structure according to claim 11 where said waste material contains organic matter.

17. A method according to claim 12 wherein said recessed area is about 6 to about 16 feet in width at the bottom, about 12 to about 18 feet wide at the top, with a height of about 12 to about 30 feet, and with sides that slope at an angle of about 5° to about 10°.

18. A method according to claim 12 where said waste material contains organic matter.

* * * * *